| United States Patent [19] | [11] Patent Number: 4,792,483 |
| Miyake et al. | [45] Date of Patent: Dec. 20, 1988 |

[54] MAGNETIC RECORDING MEDIUM

[75] Inventors: Akira Miyake, Kyoto; Mikio Kishimoto, Osaka, both of Japan

[73] Assignee: Hitachi Maxell, Ltd., Osaka, Japan

[21] Appl. No.: 28,565

[22] Filed: Mar. 20, 1987

[30] Foreign Application Priority Data

Mar. 20, 1986 [JP] Japan ................................. 61-63172

[51] Int. Cl.$^4$ ................................................ G11B 5/70
[52] U.S. Cl. ..................................... 428/323; 427/128; 428/694; 428/695; 428/900
[58] Field of Search ............... 428/323, 694, 695, 900; 427/128

[56] References Cited

U.S. PATENT DOCUMENTS

| 4,450,199 | 5/1984 | Tadokoro et al. | 427/128 |
| 4,565,726 | 1/1986 | Oguchi et al. | 428/694 |
| 4,567,096 | 1/1986 | Piltingsrud et al. | 427/128 |
| 4,585,697 | 4/1986 | Kato et al. | 428/694 |
| 4,626,463 | 12/1986 | Fujishiro et al. | 428/694 |

Primary Examiner—Paul J. Thibodeau
Attorney, Agent, or Firm—Birch, Stewart, Kolasch & Birch

[57] ABSTRACT

A magnetic recording medium with improved durability is provided and comprises a substrate and a magnetic layer formed thereon which contains hexagonal system ferrite magnetic powder in a volume percentage of not larger than 35% per whole volume of the magnetic layer.

6 Claims, No Drawings

MAGNETIC RECORDING MEDIUM

BACKGROUND OF THE INVENTION

1. Field of the Invention

The present invention relates to a magnetic recording medium. More particularly, it relates to a magnetic recording medium with improved durability comprising a magnetic layer containing hexagonal system ferrite powder as the magnetic powder.

2. Description of the Prior Arts

Conventionally, the magnetic properties of a magnetic recording medium has been improved, for example, by orientating longer axis of acicular particles of magnetic powder in the direction along a longitudinal direction of the magnetic layer. However, in the magnetic recording medium which utilizes magnetic components in the longitudinal direction of a magnetic layer, the strength of a diamagnetic field in the magnetic layer increases as the magnetic recording density increases. Therefore, the recording density has its own limitations.

In a perpendicular magnetic recording system which utilizes a magnetic component perpendicular to the plane of a magnetic layer, the strength of the demagnetizing field decreases as the recording density increases, so that such a recording system is recognized as being suitable for high density recording. As the most suitable magnetic powder for the perpendicular magnetic recording system, hexagonal system ferrite powder is used each particle of which has a platelet shape and magnetic easy axis in a direction perpendicular to said platelet plane (cf. Japanese Patent Kokai Publication (unexamined) No. 209928/1985).

However, the magnetic layer of a conventional magnetic recording medium, contains hexagonal system ferrite powder in a volume percentage of 42% or more based on the volume of the magnetic layer. Therefore, the amounts of a binder component which bonds the magnetic power to the substrate of an abrasive which reinforces the magnetic layer and of a lubricant which improves the lubricity of the surface of a magnetic powder is decreased, so that durability of the magnetic layer is not satisfactory.

SUMMARY OF THE INVENTION

One object of the present invention is to provide a magnetic recording medium with improved durability which comprises a magnetic layer containing hexagonal system ferrite magnetic powder in a reduced volume percentage.

Another object of the present invention is to provide a magnetic recording medium comprising magnetic layer which contains hexagonal system ferrite magnetic powder in a reduced volume percentage and is capable of containing increased amounts of a binder resin and other additives such as an abrasive and a lubricant.

These and other objects are accomplished by a magnetic recording medium according to the present invention comprising a substrate and a magnetic layer formed thereon which contains hexagonal system ferrite magnetic powder in a volume percentage of not larger than 35% per whole volume of the magnetic layer.

When the magnetic layer has a porosity of not smaller than 20% by volume, it is imparted with a cushioning effect so as to absorb shock caused by contact of the magnetic recording medium to a magnetic head. In addition, a sufficient amount of lubricant can be contained in the pores, whereby the durability of the magnetic layer is further improved.

DETAILED DESCRIPTION OF THE INVENTION

According to the present invention, the volume percentage of the hexagonal system ferrite magnetic powder per whole volume of the magnetic layer is not larger than 35%, preferably not larger than 30%. When the volume percentage of the hexagonal system ferrite magnetic powder is not larger than 35%, the binder resin which bonds the magnetic powder to the substrate, the abrasive which reinforces the magnetic layer, the lubricant which increases lubricity of the surface of the magnetic layer or other additives can be contained in the magnetic layer in such amounts so as to sufficiently improve the durability of the magnetic recording medium. If the volume percentage of the hexagonal system ferrite magnetic powder is larger than 35%, these additives cannot be contained in the magnetic layer in sufficient amounts so as to satisfactorily improve the durability of the magnetic recording medium.

Preferably, the magnetic layer has a porosity of not smaller than 20%. When the porosity is not smaller than 20%, the magnetic layer is imparted with a cushioning effect in order for the magnetic layer to be capable of absorbing the shock caused by the contact of the magnetic recording medium with the magnetic head. Further, when the lubricant is contained in the pores, lubricity and as well as durability of the magnetic recording medium are further improved.

Specific examples of the hexagonal system ferrite magnetic powder are barium ferrite magnetic powder, strontium ferrite magnetic powder, lead ferrite magnetic powder, calcium ferrite magnetic powder and the like. In such ferrite magnetic powder, a part of the iron atoms may be replaced by other metal atoms such as cobalt, titanium, zinc, zirconium, nickel, manganese, niobium and indium. A platelet of the hexagonal system ferrite magnetic powder has a size of 0.05 to 0.2 $\mu$m. When the particle size of the hexagonal sustem ferrite magnetic powder is smaller than 0.05 $\mu$m, a volume of the platelet becomes too small which results in the strength of the magnetic layer not to be improved. The hexagonal system ferrite magnetic powder having a platelet size of not smaller than 0.05 $\mu$m can effectively reinforce the magnetic layer and improve the durability of the magnetic recording medium. When the platelet size of the hexagonal system ferrite magnetic powder is larger than 0.2 $\mu$m, a noise level of the magnetic recording medium would be unfavorably increased.

To efficiently carry out high density recording, the hexagonal system ferrite magnetic powder preferably has a saturation magnetization of 30 to 70 emu/g and a coercive force of 200 to 2,000 Oe.

The lubricant contained in the magnetic layer can be any one of conventionally used lubricants. Preferred examples of these lubricants are aliphatic lubricants such as aliphatic acid esters, aliphatic acids, metal salts of aliphatic acids, aliphatic acid amide and aliphatic alcohols, fluorine-containing lubricants, silicone type lubricants, hydrocarbon type lubricants and the like.

Preferred examples of the aliphatic acid ester are oleyl oleate, 2-ethylhexyl oleate, butyl stearate, octyl myristate, monoglyceride stearate, monoglyceride palmitate, monoglyceride oleate, pentaerythritol tetrastearate and the like. Preferred examples of the aliphatic acid are lauric acid, myristic acid, palmitic acid, oleic acid, stearic acid, behenic acid and the like. Preferred examples of the metal salts of the aliphatic acid are lithium salt, sodium salt, calcium salt, magnesium salt, aluminum salt, iron salt, cobalt salt, zinc salt, barium salt and lead salt of the above exemplified aliphatic acids. Preferred examples of the aliphatic acid amide are caproic amide, caprylic amide, lauric amide, palmitic amide, behenic amide, oleic amide, linolic amide, methylenebisstearic amide and the like. Preferred examples of the aliphatic alcohol are stearyl alcohol, myristyl alcohol and the like.

As the fluorine-containing lubricant, there are exemplified trichlorofluoroethylene, perfluoropolyether, perfluoro(alkyl polyether), perfluoroalkyl carboxylic acid. Examples of commercially available fluorine-containing lubricants are Daiflon #20 (Daikin Industries Co., Ltd.) Crytox M, Crytox H and Bidax (DuPont), Fomblin Z (Montedison) and the like.

Preferred examples of silicone type lubricants are silicone oil and modified silicone oil. Preferred examples of hydrocarbon type lubricants are liquid paraffin, squalane and synthetic squalane.

Preferably, the lubricant is added to the magnetic layer in an amount of 0.1 to 25% by weight based on the weight of the hexagonal system ferrite magnetic powder. When the amount of the lubricant is less than 0.1% by weight, the lubricity of the magnetic layer is not effectively improved. When it is larger than 25% by weight, the adhesivity of the magnetic layer with the substrate made of, for example, a polyester film is deteriorated.

The magnetic recording medium of the present invention may be produced by a conventional method. For example, the hexagonal system ferrite powder is mixed with and dispersed in a binder resin, an organic solvent and other conventional additives so that the volume percentage of the hexagonal system ferrite magnetic powder and the porosity are adjusted in the ranges as defined according to the present invention, to prepare a magnetic paint composition. Then, the composition is applied on a substrate, made of, for example, a polyester film, by a conventional coating method, for example, by means of a roll coater and dried to form a magnetic layer on the substrate. If necessary, the coated magnetic layer is calendered to adjust the porosity.

The binder resin may be of the conventional binder resins and includes vinyl chloride-vinyl acetate copolymers, polyvinyl butyral resins, cellulose type resins, polyurethane resins, polyester resins, isocyanate compounds and the like.

The organic solvent is also any of the conventional organic solvents and includes toluene, methyl isobutyl ketone, methyl ethyl ketone, cyclohexanone, tetrahydrofuran, ethyl acetate and mixtures thereof.

Examples of other additives are dispersants, lubricant, abrasive and antistatic agents.

The magnetic recording medium according to the present invention includes various forms such as a magnetic tape having a magnetic layer on one surface of the plastic tape substrate, a magnetic disc having magnetic layers on both surfaces of the disc substrate, and a magnetic drum.

The present invention will be hereinafter further explained in detail by the following examples, wherein the parts are by weight.

EXAMPLES 1–11

Hexagonal system ferrite magnetic powder n which a part of iron atoms are replaced with cobalt and titanium atoms having the properties as shown in Table 1 is used. Magnetic paint components as shown in Table 2 are compounded in a ball mill for 72 hours to prepare a magnetic paint. The magnetic paint is coated on both surface of a polyester film having a thickness of 75 μm and dried to form dry magnetic layers each having a thickness of 1.0 μm followed by calendering under conditions shown in Table 3. Then the film with the magnetic layers is blanked to produce a magnetic disc having a diameter of 20.02 cm.

COMPARATIVE EXAMPLES 1–8

In the same manner as in Examples but using hexagonal system ferrite magnetic powder as shown in Table 1 and a magnetic paint composition as shown in Table 2 and calendering the film with the magnetic layers under conditions as shown in Table 3, a magnetic disc is produced.

TABLE 1

| | Hexagonal system ferrite magnetic powder | | | | |
|---|---|---|---|---|---|
| Example No. | Diameter (μm) | Thickness (μm) | Coercive force (Oe) | Saturation magnetization (emu/g) | Specific surface area by BET method (m²/g) |
| 1 | 0.06 | 0.012 | 500 | 54 | 52 |
| 2 | 0.06 | 0.012 | 500 | 54 | 52 |
| 3 | 0.06 | 0.012 | 500 | 54 | 52 |
| 4 | 0.08 | 0.016 | 490 | 55 | 50 |
| 5 | 0.06 | 0.012 | 500 | 54 | 52 |
| 6 | 0.12 | 0.024 | 480 | 56 | 45 |
| 7 | 0.06 | 0.012 | 500 | 54 | 52 |
| 8 | 0.06 | 0.012 | 500 | 54 | 52 |
| 9 | 0.06 | 0.012 | 500 | 54 | 52 |
| 10 | 0.05 | 0.010 | 510 | 53 | 56 |
| 11 | 0.04 | 0.008 | 520 | 52 | 60 |
| Comp. 1 | 0.06 | 0.012 | 500 | 54 | 52 |
| 2 | 0.06 | 0.012 | 500 | 54 | 52 |
| 3 | 0.06 | 0.012 | 500 | 54 | 52 |
| 4 | 0.06 | 0.012 | 500 | 54 | 52 |
| 5 | 0.06 | 0.016 | 490 | 55 | 50 |
| 6 | 0.12 | 0.024 | 480 | 56 | 45 |
| 7 | 0.05 | 0.010 | 510 | 53 | 56 |
| 8 | 0.04 | 0.008 | 520 | 52 | 60 |

TABLE 2

| | Magnetic Paint Components (parts) | | | | | | | |
|---|---|---|---|---|---|---|---|---|
| Example | Magnetic Powder | Terpolymer*1 | Polyurethane resin | Isocyanate compound | Alumina | Oleyl oleate | Cyclohexanone | Toluene |
| 1 | 100.0 | 8.8 | 8.8 | 4.4 | 20.0 | 10.0 | 175 | 175 |
| 2 | 100.0 | 10.0 | 10.0 | 5.0 | 20.0 | 10.0 | 185 | 185 |
| 3 | 100.0 | 12.6 | 12.6 | 6.3 | 20.0 | 10.0 | 195 | 195 |
| 4 | 100.0 | 12.6 | 12.6 | 6.3 | 20.0 | 10.0 | 195 | 195 |
| 5 | 100.0 | 15.6 | 15.6 | 7.8 | 20.0 | 10.0 | 205 | 205 |
| 6 | 100.0 | 12.6 | 12.6 | 6.3 | 20.0 | 10.0 | 195 | 195 |
| 7 | 100.0 | 17.1 | 17.1 | 8.6 | 20.0 | 10.0 | 215 | 215 |

TABLE 2-continued

| Example | Magnetic Powder | Terpolymer*1 | Magnetic Paint Components (parts) | | | | | | |
|---|---|---|---|---|---|---|---|---|---|
| | | | Polyurethane resin | Isocyanate compound | Alumina | Oleyl oleate | Cyclo-hexanone | Toluene | |
| 8 | 100.0 | 17.1 | 17.1 | 8.6 | 20.0 | 10.0 | 215 | 215 | |
| 9 | 100.0 | 17.1 | 17.1 | 8.6 | 20.0 | 10.0 | 215 | 215 | |
| 10 | 100.0 | 12.6 | 12.6 | 6.3 | 20.0 | 10.0 | 195 | 195 | |
| 11 | 100.0 | 12.6 | 12.6 | 6.3 | 20.0 | 10.0 | 195 | 195 | |
| Comp. 1 | 100.0 | 8.8 | 8.8 | 4.4 | 20.0 | 10.0 | 175 | 175 | |
| Comp. 2 | 100.0 | 7.6 | 7.6 | 3.8 | 20.0 | 10.0 | 175 | 175 | |
| Comp. 3 | 100.0 | 6.5 | 6.5 | 3.3 | 20.0 | 10.0 | 170 | 170 | |
| Comp. 4 | 100.0 | 5.5 | 5.5 | 2.7 | 20.0 | 10.0 | 170 | 170 | |
| Comp. 5 | 100.0 | 5.5 | 5.5 | 2.7 | 20.0 | 10.0 | 170 | 170 | |
| Comp. 6 | 100.0 | 6.5 | 6.5 | 3.3 | 20.0 | 10.0 | 170 | 170 | |
| Comp. 7 | 100.0 | 6.5 | 6.5 | 3.3 | 20.0 | 10.0 | 170 | 170 | |
| Comp. 8 | 100.0 | 6.5 | 6.5 | 3.3 | 20.0 | 10.0 | 170 | 170 | |

TABLE 3

| | Calendering Conditions | | |
|---|---|---|---|
| | Temp. (°C.) | Pressure (kg/cm$^2$) | Rate (m/min.) |
| Example No. | | | |
| 1 | 50 | 175 | 40 |
| 2 | 50 | 150 | 40 |
| 3 | 50 | 150 | 40 |
| 4 | 50 | 150 | 40 |
| 5 | 40 | 150 | 40 |
| 6 | 50 | 150 | 40 |
| 7 | 50 | 200 | 40 |
| 8 | 50 | 150 | 40 |
| 9 | 50 | 100 | 40 |
| 10 | 50 | 150 | 40 |
| 11 | 50 | 150 | 40 |
| Comp. 1 | 70 | 200 | 40 |
| Comp. 2 | 40 | 200 | 40 |
| Comp. 3 | 50 | 200 | 40 |
| Comp. 4 | 50 | 150 | 40 |
| Comp. 5 | 70 | 200 | 40 |
| Comp. 6 | 50 | 205 | 40 |
| Comp. 7 | 50 | 200 | 40 |
| Comp. 2 | 50 | 200 | 40 |

The volume percentage of the hexagonal system ferrite magnetic powder and porosity in each of the magnetic discs produced in Examples and Comparative Examples are measured, and durability of the magnetic disc is tested by driving it in a floppy disc drive and counting the drive numbers when flaws appeared on the surface of the disc. The results are shown in Table 4.

TABLE 4

| | Volume percentage (vol %) | Porosity (vol %) | Durability ($\times 10^6$) |
|---|---|---|---|
| Example No. | | | |
| 1 | 34.5 | 24.8 | 4.5 |
| 2 | 32.0 | 26.1 | 5.2 |
| 3 | 29.2 | 24.4 | 5.0 |
| 4 | 29.4 | 24.2 | 5.8 |
| 5 | 27.2 | 25.9 | 6.4 |
| 6 | 29.6 | 24.0 | 7.0 |
| 7 | 27.0 | 17.4 | 3.8 |
| 8 | 25.1 | 23.2 | 6.6 |
| 9 | 23.2 | 29.1 | 9.5 |
| 10 | 28.8 | 24.8 | 4.2 |
| 11 | 28.6 | 25.0 | 3.1 |
| Comp. 1 | 36.9 | 19.6 | 1.5 |
| Comp. 2 | 36.7 | 24.5 | 2.4 |
| Comp. 3 | 39.0 | 24.1 | 1.7 |
| Comp. 4 | 39.2 | 28.1 | 2.2 |
| Comp. 5 | 42.7 | 21.7 | 0.25 |
| Comp. 6 | 39.4 | 23.7 | 2.0 |
| Comp. 7 | 38.7 | 24.4 | 1.4 |
| Comp. 8 | 38.4 | 24.7 | 1.0 |

As is understood from the results of Table 4, the magnetic discs produced in Examples 1 to 11 have better durability than those produced in Comparative Examples 1 to 8.

What is claimed is:

1. A magnetic recording medium comprising a substrate and a magnetic layer formed thereon which contains hexagonal system ferrite magnetic powder in a volume percentage of not larger than 35% based on the total volume of the magnetic layer, wherein the powder has a platelet size of 0.05 to 0.2 μm, wherein the magnetic layer has a porosity of not smaller than 20% by volume and wherein the pores contain a lubricant.

2. A magnetic recording disc comprising a substrate and a magnetic layer formed thereon which contains hexagonal system ferrite magnetic powder in a volume percentage of not larger than 35% based on the total volume of the magnetic layer, wherein the powder has a platelet size of 0.05 to 0.2 μm, wherein the magnetic layer has a porosity of not smaller than 20% by volume and wherein the pores contain a lubricant.

3. The magnetic recording medium according to claim 1, wherein the volume percentage is not larger than 30%.

4. The magnetic recording medium according to claim 1, wherein the hexagonal system ferrite powder is barium ferrite magnetic powder, strontium ferrite magnetic powder, lead ferrite magnetic powder or calcium ferrite magnetic powder.

5. The magnetic recording medium according to claim 1, wherein the hexagonal system ferrite magnetic powder has a saturation magnetization of 30 to 70 emu/g and a coercive force of 200 to 2,000 Oe.

6. The magnetic recording medium according to claim 1, wherein the lubricant is contained in an amount of 0.1 to 25% by weight based on the weight of the hexagonal system ferrite magnetic powder.

* * * * *